US012711222B2

(12) United States Patent
Kivva et al.

(10) Patent No.: US 12,711,222 B2
(45) Date of Patent: Aug. 18, 2026

(54) SYSTEM AND METHOD FOR DETECTING CYCLIC ACTIVITY IN AN EVENT FLOW FOR DYNAMIC APPLICATION ANALYSIS

(71) Applicant: AO Kaspersky Lab, Moscow (RU)

(72) Inventors: Anton A. Kivva, Moscow (RU); Vitaly V. Butuzov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 86 days.

(21) Appl. No.: 18/338,137

(22) Filed: Jun. 20, 2023

(65) Prior Publication Data

US 2024/0095353 A1 Mar. 21, 2024

(30) Foreign Application Priority Data

Sep. 15, 2022 (RU) ................................ 2022124419

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS 10,956,573 B2 3/2021 Zheng et al.
11,347,896 B1 * 5/2022 Brown, Jr ............... G06F 21/73
12,105,822 B2 * 10/2024 Beecham ............ G06F 16/9024
2017/0124327 A1 * 5/2017 Kumbhar .............. G06F 21/566
2019/0306281 A1 * 10/2019 Masputra .................. G06F 9/52
2021/0365554 A1 * 11/2021 Sakalis ................. G06F 21/554
2023/0004532 A1 * 1/2023 Panther ............... G06F 16/1744
2023/0078266 A1 * 3/2023 Werner ................... H04L 65/61 370/252
2023/0308461 A1 * 9/2023 Flysher .................. G06N 20/00
2024/0291863 A1 * 8/2024 Cohen ................. H04L 63/1483

FOREIGN PATENT DOCUMENTS

EP 3531329 A1 * 8/2019 ........... G06F 21/566

* cited by examiner

*Primary Examiner* — Linglan Edwards
*Assistant Examiner* — Jacob Benedict Knackstedt
(74) *Attorney, Agent, or Firm* — ArentFox Schiff LLP; Michael Fainberg

(57) ABSTRACT

Disclosed herein are systems and methods for detecting cyclic activity in an event stream. In one aspect, an exemplary method comprises, creating a buffer, determining a threshold for indicating a beginning of a cycle, processing each event by filling the buffer with the event, determining a number of unique events in the buffer, when the number reaches a predetermined size of the buffer, replacing one event with another by excluding the earliest event and including the new event, recalculating the number of unique events, comparing the recalculated number with a threshold for a maximum number of unique events for cycle detection, detecting a beginning of a cycle when the number of unique events is less than or equal to the maximum number of unique events for cycle detection, excluding further events from the event stream, and continuing to recalculate the number of unique events after each addition.

17 Claims, 4 Drawing Sheets

| Events (call) | | Cycle detection | |
|---|---|---|---|
| 1. | aaa() | 1. | W = [aaa], X = [aaa] |
| 2. | bbb() | 2. | W = [aaa, bbb], X = [aaa, bbb] |
| 3. | ccc() | 3. | W = [aaa, bbb, ccc], X = [aaa, bbb, ccc] |
| 4. | ddd() | 4. | W = [aaa, bbb, ccc, ddd], X = [aaa, bbb, ccc, ddd] |
| 5. | eee() | 5. | W = [aaa, bbb, ccc, ddd, eee], X = [aaa, bbb, ccc, ddd, eee] |
| 6. | fff() | 6. | W = [aaa, bbb, ccc, ddd, eee, fff], X = [aaa, bbb, ccc, ddd, eee, fff] |
| 7. | eee() | 7. | W = [aaa, bbb, ccc, ddd, eee, fff, eee], X = [aaa, bbb, ccc, ddd, eee, fff] |
| 8. | fff() | 8. | W = [aaa, bbb, ccc, ddd, eee, fff, eee, fff]; W 8 elements completed, \|X\| = 6 > 2 – no cycle |
| 9. | eee() | 9. | W = [bbb, ccc, ddd, eee, fff, eee, fff, eee]; excluding first element, adding a new one |
| 10. | fff() | 10. | W = [ccc, ddd, eee, fff, eee, fff, eee, fff], X = [ccc, ddd, eee, fff]; \|X\| = 4 |
| 11. | eee() | 11. | W = [ddd, eee, fff, eee, fff, eee, fff, eee], X = [ddd, eee, fff]; \|X\| = 3 |
| 12. | fff() | 12. | W = [eee, fff, eee, fff, eee, fff, eee, fff]; \|X\| = 2 equal threshold – enter cycle |
| 13. | eee() | 13. | W = [fff, eee, fff, eee, fff, eee, fff, eee], X = [eee, fff]; \|X\| = 2 |
| 14. | fff() | 14. | W = [eee, fff, eee, fff, eee, fff, eee, fff], X = [eee, fff]; \|X\| = 2 |
| 15. | eee() | 15. | W = [fff, eee, fff, eee, fff, eee, fff, eee], X = [eee, fff]; \|X\| = 2 |
| 16. | fff() | 16. | W = [eee, fff, eee, fff, eee, fff, eee, fff], X = [eee, fff]; \|X\| = 2 |
| 17. | fff() | 17. | W = [fff, eee, fff, eee, fff, eee, fff, fff], X = [eee, fff]; \|X\| = 2 |
| 18. | fff() | 18. | W = [eee, fff, eee, fff, eee, fff, fff, fff], X = [eee, fff]; \|X\| = 2 |
| 19. | aaa() | 19. | In cycle, aaa() does not belong to W – exit cycle, W = [aaa], X = [aaa]; |
| 20. | bbb() | 20. | W = [aaa, bbb], X = [aaa, bbb] |

Fig. 3

SYSTEM AND METHOD FOR DETECTING CYCLIC ACTIVITY IN AN EVENT FLOW FOR DYNAMIC APPLICATION ANALYSIS

CROSS REFERENCE TO RELATED APPLICATIONS

The present application claims priority to Russian Patent Application No. 2022124419, filed on Sep. 15, 2022, the entire content of which is incorporated herein by reference.

FIELD OF TECHNOLOGY

The present disclosure relates to the field of information technology, more specifically to the field of studying the behavior of an application during analysis, by a System of Dynamic Analysis (SDA), for determining malicious behavior.

BACKGROUND

Currently, malware is one of the series threats to computer security. The term "malware" refers to any program that exhibits malicious behavior and/or acts as one or more of: worms, viruses, Trojans, system errors, spyware, certain advertisements, etc. Any suspicious program that could harm a computer system is potentially malicious.

There are various approaches and tools that may be applied to study functionalities of such programs (malwares). One approach is dynamic analysis, which involves analyzing the program execution process. There is a special class of automated tools, such as dynamic analysis systems, that is a part of the dynamic analysis performed to investigate the functionalities of programs and to detect malware. Dynamic analysis systems allow you to quickly obtain information about the operations performed by a particular program during its execution.

Modern systems used for dynamic analysis are large software running on a complex of server computers on which the analysis is carried out, for example, by launching a sample application for execution in a special environment, and then automatically monitoring the activities of the sample application during its execution. As a result of the work of these systems, a report may be obtained. The report may contain information in one form or another about operations performed by the application under study. At the same time, these systems used for the above dynamic analysis may have one or more different functionalities. For instance, one functionality may use an analysis component that is executed in user mode and hosted on the same computing device where the sample analysis application is executed. Another functionality may use emulation, and the analysis may be done through a callback function. A third functionality may use the capabilities provided by the hardware virtualization extension. To illustrate, one example of a system of dynamic analysis may be a tool, such as Kaspersky Research Sandbox, designed to detect and analyze targeted or tailored threats. Another example may be Kaspersky's Anti Targeted Attack Platform (KATA) tool, designed to protect against targeted attacks.

There are some known systems for dynamic analysis. However, these known systems for dynamic analysis have common drawbacks that arise when using the tools. Systems for dynamic analysis of applications typically generate a stream of data that describes events that occur while the application is running. At the same time, in many cases, this data takes up a large amount of memory and disk space, is processed for a long time, and the process of generation of the data negatively affects the overall performance of the dynamically analyzed application itself. Consequently, there is an increase in one or more of: computational costs of the dynamic analysis, and a negative impact on user experiences when the analysis is performed real-time on a computing device of a user.

Therefore, there is a need for a method and a system for detecting cyclic (repetitive) activity in an event flow for dynamic application analysis. In particular, there is a need for a method and system of reducing the load on operations of the SDA during the determination of a maliciousness of an application.

SUMMARY

Aspects of the disclosure relate to for detecting cyclic activity in an event flow for dynamic application analysis.

In one exemplary aspect, a method is provided for detecting cyclic activity in an event flow for dynamic application analysis, the method comprising: creating a buffer of a predetermined size for the event stream that occurs during an execution of an application, and determining a threshold for indicating a beginning of a cycle; processing each event in the event stream, wherein the processing includes filling the buffer with the event, filling a dictionary, determining a number of unique events in the buffer when the event is added to the buffer; when a number of events in the buffer reaches the predetermined size of the buffer, replacing one event in the buffer with a new event by excluding the earliest event and including the event that is newly processed, recalculating the number of unique events in the buffer, and comparing the recalculated number of unique events with a threshold for a maximum number of unique events in the buffer for cycle detection; and detecting a beginning of a cycle when the number of unique events in the buffer is less than or equal to the maximum number of unique events in the buffer for cycle detection, excluding further events from the event stream, and continuing to recalculate the number of unique events in the buffer after each addition of a new event.

In one aspect, the determination of the threshold for indicating the beginning of the cycle is performed using a ratio: $HC=L/K$, where, HC represents the maximum number of unique events in the buffer for cycle detection, L represents a parameter for a size of the buffer which indicates a maximum number of events in the buffer, and K represents a configurable parameter.

In one aspect, when the number of unique events in the buffer is greater than the maximum number of unique events in the buffer for cycle detection, continuing to fill the buffer replacing one event in the buffer with the new event and recalculating the number of unique events in the buffer until the number of unique events in the buffer less than or equal to the maximum number of unique events in the buffer for cycle detection.

In one aspect, the method further comprises: after the beginning of the cycle is detected, when the number of unique events in the buffer increases and exceeds the maximum number of unique events in the buffer for cycle detection, completing the cycle and begin including events generated in the event stream during the dynamic analysis of the application.

In one aspect, the method further comprises: creating another buffer to which events occurring in the event stream are added; and counting the number of unique events in the generated buffer to detect another cycle.

In one aspect, during the execution of the application are raised from system Application Programming Interface (API) calls.

In one aspect, the buffer comprises a ring buffer.

In one aspect, the maximum number of unique events in the buffer for cycle detection is less than a size of the buffer which indicates a maximum number of events in the buffer, and the maximum number of unique events in the buffer for cycle detection is less than the total number of events.

In one aspect, the buffer is generated in real time during the dynamic analysis of the application.

According to one aspect of the disclosure, a system is provided for detecting cyclic activity in an event flow for dynamic application analysis, the system comprising a hardware processor configured to: create a buffer of a predetermined size for the event stream that occurs during an execution of an application, and determine a threshold for indicating a beginning of a cycle; process each event in the event stream, wherein the processing includes filling the buffer with the event, filling a dictionary, determining a number of unique events in the buffer when the event is added to the buffer; when a number of events in the buffer reaches the predetermined size of the buffer, replace one event in the buffer with a new event by excluding the earliest event and including the event that is newly processed, recalculate the number of unique events in the buffer, and compare the recalculated number of unique events with a threshold for a maximum number of unique events in the buffer for cycle detection; and detect a beginning of a cycle when the number of unique events in the buffer is less than or equal to the maximum number of unique events in the buffer for cycle detection, exclude further events from the event stream, and continue to recalculate the number of unique events in the buffer after each addition of a new event In one exemplary aspect, a non-transitory computer-readable medium is provided storing a set of instructions thereon for detecting cyclic activity in an event flow for dynamic application analysis, wherein the set of instructions comprises instructions for: creating a buffer of a predetermined size for the event stream that occurs during an execution of an application, and determining a threshold for indicating a beginning of a cycle; processing each event in the event stream, wherein the processing includes filling the buffer with the event, filling a dictionary, determining a number of unique events in the buffer when the event is added to the buffer; when a number of events in the buffer reaches the predetermined size of the buffer, replacing one event in the buffer with a new event by excluding the earliest event and including the event that is newly processed, recalculating the number of unique events in the buffer, and comparing the recalculated number of unique events with a threshold for a maximum number of unique events in the buffer for cycle detection; and detecting a beginning of a cycle when the number of unique events in the buffer is less than or equal to the maximum number of unique events in the buffer for cycle detection, excluding further events from the event stream, and continuing to recalculate the number of unique events in the buffer after each addition of a new event.

The method and system of the present disclosure for detecting cyclic activity in an event flow for dynamic application analysis address the limitations of existing SDAs when analyzing an application to determine the maliciousness of the application. One technical result of the present method is reduction of the load on the computing resources of the computer system from actions of the SDA, for example, during the analysis of the application in real-time. Another technical result of the present method and system is that information about cyclic events is skipped is not written in data logs or files that are used for analysis by the SDA, such as subsequent steps of the SDA when analyzing applications. In one aspect, the method reduces the load on the computing resources by detecting cyclic activities (repetitive cycles) in the event stream and excluding the events related to the cyclic activities from data stream formed for subsequent analysis of the SDA. At the same time, cyclic activity in the event stream looks like many times. A recurring set of events. Thus, the present method reduces the load on the systems for dynamic analysis used to analyze applications—thereby reducing the amount of memory and disk space used by the computer device during such analysis. For instance, the method of the present disclosure detects events related to cyclic activity (cycle) in the data flow during the operation of the system on applications and excludes these events from subsequent analysis. The exclusion of the events related to cyclic activity significantly reduces the load on computing resources.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 illustrates an example of an operation of the method of detecting cyclic activity in an event stream in accordance with aspects of the present disclosure, e.g., an example of the operation of the method of FIG. 2.

DETAILED DESCRIPTION

Exemplary aspects are described herein in the context of a system, method, and a computer program for detecting cyclic activity in an event flow for dynamic application analysis in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 4:
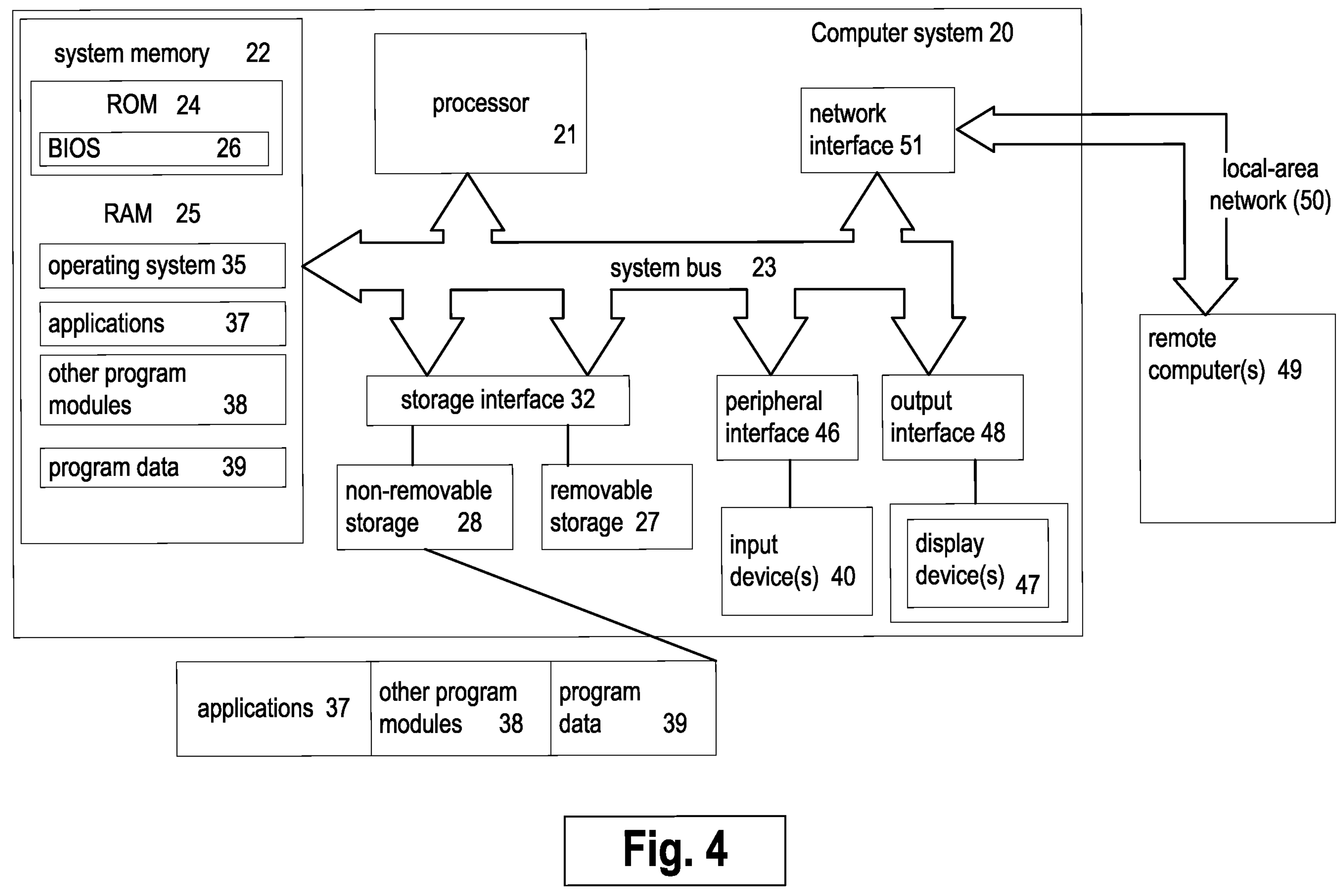
FIG. 4 presents an example of a general-purpose computer system on which aspects of the present disclosure can be implemented.

The System of Dynamic Analysis (SDA) is designed to search for threat and malicious actions in a computer system, for instance, as presented in FIG. 4. The SDA provides for a full launch of an application or file followed by a study of all the actions that are carried out, artifacts that are created, and network activity. The application can be launched both directly on the computer, i.e., in a physical environment, and in a virtual environment, however, as a rule, such physical or virtual environments contain a number of restrictions and are controlled execution environments by the SDA. In one aspect, a so-called "sandbox" may be used as the controlled medium. In other aspect, the sandbox or any other similar isolated environment may be used. A physical medium is a data transmission medium in which information (data) is transmitted from a source device (transmitter) to a receiver device (receiver) using signals. In the present disclosure, the term "signal" refers to an electrical signal.

Depending on aspects of the present disclosure and the implementation, the SDA may include a single dynamic analysis mechanism or several dynamic analysis mechanisms. Moreover, in one aspect, the SDA may be implemented on a separate server dedicated for dynamic analysis of applications (for example, Kaspersky Research Sandbox). In another aspect, the SDA may be implemented directly on the computing device of the user, such as a personal computer, a tablet, mobile device, or a similar device. The SDA implemented on the separate server or on a computing device of the user may include any number of dynamic analysis mechanisms. During dynamic analysis, an analysis is performed to determine the behavior of an application during its execution, including the network activity of the application. In one aspect, the analysis is performed on multiple computer device emulators running on physical or virtual devices.

In one aspect, the SDA is configured when it is activated for the first time. The configuration of the SDA includes at least formation of a certain controlled environment in which the audited application will be executed, and an activation of one or more analysis mechanisms that are part of the SDA.

As discussed above, dynamic analysis analyzes the behavior performed by the application to check for actions of the application related to suspicious or malicious behavior while the application is running. The SDA uses various evaluation mechanisms (e.g., heuristic rules or a probabilistic approach) to help determine whether a particular behavior (e.g., running a particular file or connecting a library) should be considered malicious.

In one aspect, the environment used by the SDA is designed in such a way that the events that occur from the actions that occur during the execution of the application are recorded as they occur. In one aspect, data related to events that occur is recorded and stored in a specific database. The database can be either a temporary file or another suitable storage location, such as an MSSQL or PostgreSQL database. In one aspect, the events occur during the execution of the application when system Application Programming Interface (API) calls are made.

In other words, during the analysis of the application, a data stream is generated in the SDA, describing the events that occur during the operation of the application. The data stream includes information about all events that occur during the execution of the application. In many cases, the data associated with the events that occur will consume a large amount of memory and disk space, take a long time to process (for example, because of their quantity). In addition, the process of creating the data negatively affects the performance of the application that is being dynamically analyzed. All this leads to an increase in the computational costs of dynamic analysis. In the case of real-time analysis on the computing device of the user, there is an associated negative impact on the experience of the user.

Thus, the method of the present disclosure addresses the above shortcomings. The method consists detecting cyclic activities (cycles) in the event stream and excluding the detected cyclic activities from the data stream. The term "cyclic activity" refers to repetitive activity. Thus, "cyclic activity in the event stream" is defined as a "repeated set of events". Thus, exclusion of such cyclic activities results in data formed for subsequent analysis of the SDA being data that does not contain the detected cyclic activities.

In one aspect, the method of the present disclosure includes identifying the cycles by estimating events from a stream of events occurring in real time during the operation of the application. When evaluated, all events fall into a buffer of the specified size. Then, the method determines the number of unique events, and presences of cyclic activities in the buffer using the determined number of unique events. The term "unique event" refers to an event that appeared in the buffer for the first time. The unique event is unique only until the cycle is reset. In a particular implementation, the buffer is the area of memory used to temporarily store I/O data.

In addition, when determining the number of unique events X in the buffer, the SDA decides that the application performs cyclic activity when the following condition is satisfied:

$|X| \ll |S|$ and $|X| \ll L$, where

S—the total set of possible events during the execution of the application,

L—number of events in the buffer (buffer size), and

X—the number of unique events in the buffer.

In one aspect, when the SDA determines that the application performs cyclic activity, the SDA ceases to output or record new events for later analysis and continues only to observe the events that are taking place. As soon as an event that is not part of many unique X events appears, the state of the cycle is reset and an advanced threat analytics or similar tool may again begin to output or record events for analysis.

The following are some aspects of the method of the present disclosure for processing events for detecting cyclic activity in the event stream generated when the application is being analyzed by the SDA. In one aspect, the method of the present disclosure is used for the purpose of detecting malicious activity in the application being analyzed by the SDA.

Figure 1:
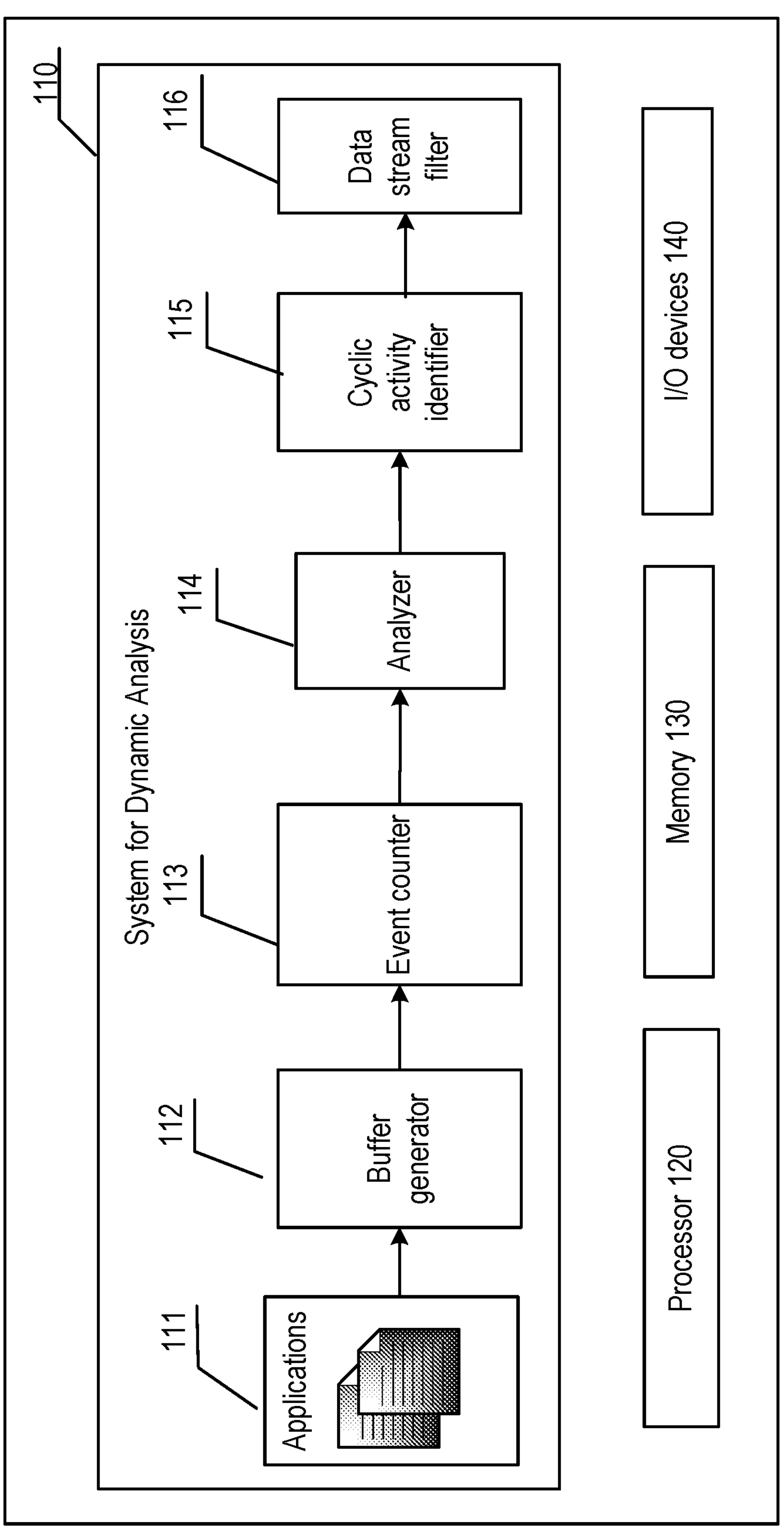
FIG. 1 illustrates a block diagram of an exemplary system for detecting cyclic activity in an event stream in accordance with aspects of the present disclosure.

FIG. 1 illustrates a block diagram of an exemplary system 100 for detecting cyclic activity in an event stream in accordance with aspects of the present disclosure. In one aspect, the system 100 comprises a system 110 (or subsystem) for dynamic analysis of applications, a processor 120, memory 130, and I/O devices 140. In one aspect, the system 110 may include components for receiving the application to be analyzed, for generating buffers, for counting events, for performing analysis and determining when a cyclic activity is detected. Then, the system 110 may exclude, from the data stream, events related to the detected cyclic activity.

In one aspect, the system 100 is implemented via a general-purpose computer, as shown in FIG. 4, including a hardware processor and memory. The system 110 may comprise functional and/or hardware modules for receiving an application to be analyzed 111, a buffer generator 112, event counter 113, analyzer 114, cyclic activity identifier 115, data stream filter 116 for excluding event related to the cyclic activity, which in turn comprise instructions for execution on the hardware processor.

Figure 2:
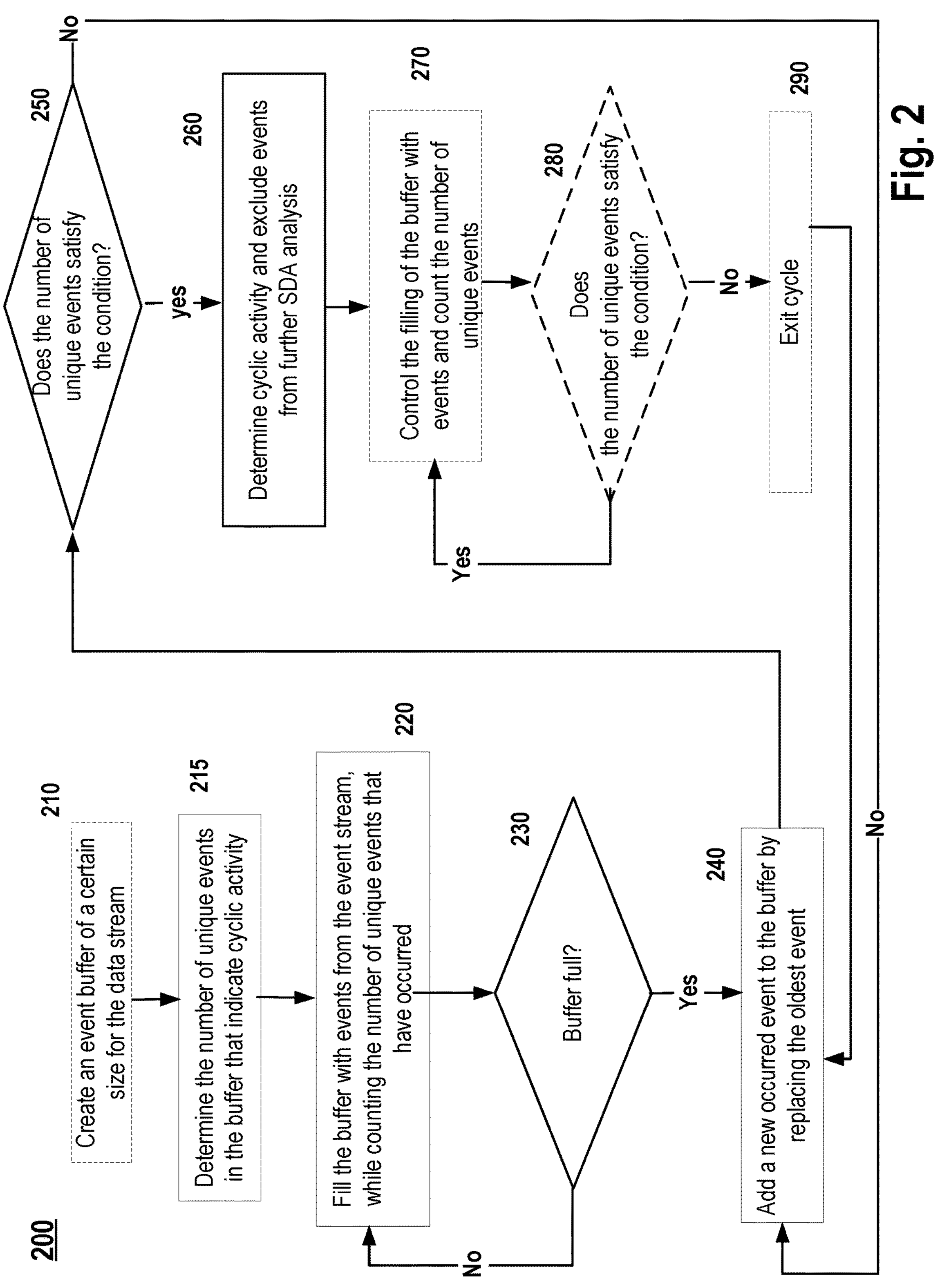
FIG. 2 illustrates a method for detecting cyclic activity in an event stream for a system of dynamic analysis in accordance with aspects of the present disclosure.

FIG. 2 illustrates a method 200 for detecting cyclic activity in an event stream for a system of dynamic analysis in accordance with aspects of the present disclosure. In one aspect, the automated search for such cyclic events and subsequent exclusion of them from the data stream in the SDA may be carried out using the method 200.

In step 210, by the SDA, method 200 generates a buffer for each data stream created during an evaluation of the application. In particular, the method creates a ring buffer (also referred to as a cyclic buffer) of a certain size, as well as a dictionary (a type of list) with an event counter in the buffer. For the present disclosure, the term “dictionary” refers to a database that contains information about unique events and the number of such events in the buffer. In one aspect, the buffer is generated in real time during the analysis of the application by the SDA. When a buffer is formed, the size of the buffer is determined (that is, the maximum number of events that can be in the buffer at the same time). The current number of elements in a dictionary is represented by “X”. The value of X is a non-zero positive integer.

In step 215, by the SDA, method 200 determines a number of unique events in the buffer that indicates cyclic activity. It is worth noting that a threshold for indicating a beginning of the cycle in the buffer is determined by the following ratio:

Xc=L/K, where,

K—is a configurable parameter,

L—represents a parameter for buffer size, which determines the maximum number of events in the buffer, or, in other words, the minimum length of a detected cycle, and Xc—represents is the number of unique events in the buffer that indicates the beginning of cyclic activity in the buffer, or, in other words, the maximum number of unique events for detection of a cyclic activity.

In one aspect, the parameters K and L are configured based on the type of events. For example, K and L may be configured by taking into account the type of operating system in which the application is running, such as Android, Windows, Unix or Linux. In another aspect, the parameters K and L may be configured by also taking into account event settings. For example, the unique event may be a “file creation” event. In another example, the unique event may be “creating a file in the user’s folder”, and/or creating a file in the system folder. Accordingly, for different sets of possible events and frequencies of occurrence of various events, the parameters may be selected differently.

In step 220, by the SDA, method 200 processes each event in the event stream, wherein the processing of the events includes filling the buffer with events from the event stream, filling the dictionary, determining a number of unique events in the buffer (i.e., X) each time an event is added to the buffer, and proceeding to step 230 to determine whether or not the buffer is full.

In step 230, by the SDA, method 200 determines whether the buffer is filled with the maximum number of events. When the buffer is filled with the maximum number of events, method 200 proceeds to step 240. Otherwise, the method returns to step 220 and continues to fill the buffer with the next event in the event steam.

In step 240, by the SDA, method 200 replaces one event in the buffer with a new event by excluding the earliest event and including the event that has just occurred, and recalculates the number of unique events.

In step 250, by the SDA, method 200 compares the calculated number of unique events, X, with the threshold of Xc (threshold value), which represents the maximum number of unique events for detection of a cyclic activity. When the condition of the relationship |X|<=Xc is satisfied, the method 200 determines that a beginning of a cyclic activity is detected and proceeds to step 260. Otherwise, if the calculated number of unique events does not satisfy the above specified condition, i.e., |X|>Xc, then method 200 returns to step 240.

In step 260, by the SDA, method 200 determines the cyclic activity and excludes further events from the event stream for subsequent analysis of the application by the SDA. In other words, the method stops recording the events that occur from the analysis of the application.

In step 270, by the SDA, method 200 additionally continues to monitor the filling of the buffer with new events and recalculate the number of unique events in the buffer.

In optional step 280, by the SDA, method 200 determines whether or not conditions for exceeding the threshold for the number of unique events is satisfied. In other words, the method determines the fulfillment of the condition |X|<=Xc. If the threshold for the maximum number of unique events is not exceeded, method 200 returns to step 270. Otherwise, if the threshold for the maximum number of unique events is exceeded, then the method proceeds to step 290.

In one aspect, the implementation at step 280 includes checking the fulfillment of a condition that, when any new event in the cycle appears, i.e., an event that is not included in the set of unique events X appears, indicating that the threshold for the number of unique events is exceeded, and proceeding to step 290.

In step 290, by the SDA, method 200 determines that the cyclic activity is completed and restores the formation of the event stream by recording (enabling) further events for subsequent analysis of the SDA application. Thus, in step 290, method 200 exits the cyclic activity.

It is worth noting that in case of exiting the cycle, the method continues to detect new cyclic activity in the event stream until the application runs out.

In one aspect, the buffer size may change dynamically. For example, if the analysis of the application takes a long time and the cycle was not detected all this time, the buffer size may be increased or decreased. In this case, the time after which a decision will be made to increase or decrease the buffer size, and the amount of change in the buffer may be determined empirically.

FIG. 3 illustrates an example 300 of an operation of the method of detecting cyclic activity in an event stream in accordance with aspects of the present disclosure, e.g., an example of the operation of the method of FIG. 2.

Suppose that when an application is running, its S event set consists of six (6) kinds of events: aaa, bbb, ccc, ddd, eee, and fff. The size of the buffer, W, will be |W|=L=8. The ratio of buffer length L to the number of unique events in buffer X for cycle detection in the buffer may be L/|Xc|=K=4. Therefore, in this scenario, in order to detect the cycle, the method checks whether or not |Xc|*K<=L, i.e., |Xc|<=2.

The selected buffer parameters ensure that:

L<|S|,

|Xc|<L, and

|Xc|<|S|

As mentioned above, |Xc| is responsible for the maximum number of unique events in the detected cycle, and L is the minimum length of the detected cycle. Thus, with the selected parameters, the claimed invention is capable of finding a cycle of at least 8 events in length, containing no more than 2 unique events.

Thus, FIG. 3 shows the flow of events during application execution using the SDA. The second column of FIG. 3 (titled cycle detection) shows an example of filling the buffer with events that occur and determining the beginning and end of the cycle, the events of which will be excluded from the stream of events provided for analysis of the SDA.

The first step is an "aaa" event, which is added to the buffer and dictionary as the first unique event.

Thus, all events that occur during application execution fill the buffer until it is full, i.e., the number of events in it does not reach the maximum number of events in the buffer. Since the buffer can contain only 8 events at a time, the eighth step counts the number of unique events contained in the buffer, which is compared with the condition for detecting cyclic activity. According to this example, the eighth step $|X|=6$, which is greater than 2. Accordingly, there is no cycle. Data collection is ongoing. In the next ninth step, the first event is excluded from the buffer and a new event is entered, and the number of unique events is recalculated. According to steps 9 through 11 of FIG. 3, the number of unique events in the buffer began to decrease and only two unique events remained in the buffer in step 12. The entry into the cycle at the 12th step (call) was detected. From this event, subsequent events are excluded from the event stream. Thus, during the 13th-18th steps (events occurring), the number of unique events does not change and, accordingly, all events are excluded. Step 19 introduces a unique new event in the event stream, which results in a change in the number of unique events, while $|X|=3$, and, accordingly, the cycle exits and data collection in the event stream resumes.

It is worth noting that a cycle will be a state when a certain number of unique events will be in the buffer, and their order in the buffer is not important. For example, for two events a and b, the following sets of events will be cycles: "ababababababab" and "aabbbabbabbbbbbbbaaabab".

At the same time, a new similar buffer is created, to which new events are added from the event stream, and the number of unique events is counted until the analysis of the application in the SDA is completed.

In another aspect, the said buffer is cleared and the new events that have occurred are re-added from the event stream and the number of unique events is counted until the analysis (execution) of the application in the SDA is completed.

In yet another aspect, it is preferable to use the following value relationships:

$|Xc| \ll L$, and $|Xc| \ll |S|$

So, for example, when $|S|=5000$ types of events, and the buffer size $L=500$ events, the method may set the threshold value for the number of unique events as 50. In this case, a mathematical ratio much less is defined as 10/100/N.

It's worth noting that if you choose the wrong buffer value and threshold, such as $|S|=50$ kinds of events with the same buffer length of 500 events, using the threshold condition $|Xc|=50$ will not allow you to determine the cyclic activity (cycle), because more than 50 events will never appear in the buffer.

FIG. 4 is a block diagram illustrating a computer system 20 on which aspects of systems and methods for detecting cyclic activity in an event stream for a system of dynamic analysis may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting cyclic activity in an event stream during dynamic analysis of an application, the method comprising:

creating a buffer of a predetermined size for the event stream that occurs during an execution of the application, and determining a threshold representing a maximum number of unique events in the buffer for cycle detection;

processing each event in the event stream by filling the buffer with the event and determining a number of unique events in the buffer when the event is added to the buffer;

when a number of events in the buffer reaches the predetermined size of the buffer, replacing one event in the buffer with a new event by excluding an earliest event and including the new event that is newly processed, recalculating the number of unique events in the buffer, and comparing the recalculated number of unique events with the threshold;

detecting a beginning of a cycle in the buffer when the number of unique events in the buffer is less than or equal to the threshold, and, in response to the detection of the beginning of the cycle, excluding further events occurring in the event stream from subsequent analysis by skipping recording of data related to the further events, and continuing to add each of the further events to the buffer and recalculate the number of unique events in the buffer after said further event is added to the buffer, wherein the threshold is determined using a ratio: Xc=L/K, where Xc represents the maximum number of unique events in the buffer for cycle detection, L represents a parameter for the predetermined size of the buffer which indicates a maximum number of events in the buffer, K represents a configurable parameter.

2. The method of claim 1, further comprising:

when the number of unique events in the buffer is greater than the maximum number of unique events in the buffer for cycle detection, continuing to fill the buffer by replacing one event in the buffer with another new event that is newly processed and recalculating the number of unique events in the buffer until the number of unique events in the buffer is less than or equal to the maximum number of unique events in the buffer for cycle detection.

3. The method of claim 1, further comprising:

after the beginning of the cycle is detected, when the number of unique events in the buffer increases and exceeds the maximum number of unique events in the buffer for cycle detection, completing the cycle and begin including further additional events occurring in the event stream in the subsequent analysis by recording data related to the further additional analysis; and clearing the buffer and re-adding new events that have occurred from the event stream to detect another cycle.

4. The method of claim 3, further comprising:

creating another buffer to which the further additional events occurring in the event stream are added; and counting the number of unique events in the another buffer to detect another cycle.

5. The method of claim 1, wherein each event in the event stream occurs during the execution of the application when system Application Programming Interface (API) calls are made.

6. The method of claim 1, wherein the buffer comprises a ring buffer.

7. The method of claim 1, wherein the maximum number of unique events in the buffer for cycle detection is less than the predetermined size of the buffer which indicates a maximum number of events in the buffer, and the maximum number of unique events in the buffer for cycle detection is less than a total number of events included in a total set of possible events during the execution of the application.

8. The method of claim 1, wherein the buffer is generated in real time during the dynamic analysis of the application.

9. A system for detecting cyclic activity in an event stream during dynamic analysis of an application, comprising:

at least one processor configured to:

create a buffer of a predetermined size for the event stream that occurs during an execution of the application, and determining a threshold representing a maximum number of unique events in the buffer for cycle detection;

process each event in the event stream by filling the buffer with the event and determining a number of unique events in the buffer when the event is added to the buffer;

when a number of events in the buffer reaches the predetermined size of the buffer, replace one event in the buffer with a new event by excluding an earliest event and including the new event that is newly processed, recalculating the number of unique events in the buffer, and comparing the recalculated number of unique events with the threshold;

detect a beginning of a cycle in the buffer when the number of unique events in the buffer is less than or equal to the threshold, and, in response to the detection of the beginning of the cycle, exclude further events occurring in the event stream from subsequent analysis by skipping recording of data related to the further events, and continue to add each of the further events to the buffer and recalculate the number of unique events in the buffer after said further event is added to the buffer, wherein the threshold is determined using a ratio: Xc=L/K, where Xc represents the maximum number of unique events in the buffer for cycle detection, L represents a parameter for the predetermined size of the buffer which indicates a maximum number of events in the buffer, K represents a configurable parameter.

10. The system of claim 9, the at least one processor further configured to:

when the number of unique events in the buffer is greater than the maximum number of unique events in the buffer for cycle detection, continue to fill the buffer by replacing one event in the buffer with another new event that is newly processed and recalculating the number of unique events in the buffer until the number of unique events in the buffer is less than or equal to the maximum number of unique events in the buffer for cycle detection.

11. The system of claim 9, the at least one processor further configured to:

after the beginning of the cycle is detected, when the number of unique events in the buffer increases and exceeds the maximum number of unique events in the buffer for cycle detection, complete the cycle and begin including further additional events occurring in the event stream in the subsequent analysis by recording data related to the further additional analysis; and clear the buffer and re-add new events that have occurred from the event stream to detect another cycle.

12. The system of claim 11, the at least one processor further configured to:

create another buffer to which the further additional events occurring in the event stream are added; and count the number of unique events in the another buffer to detect another cycle.

13. The system of claim 9, wherein each event in the event stream occurs during the execution of the application when system Application Programming Interface (API) calls are made.

14. The system of claim 9, wherein the buffer comprises a ring buffer.

15. The system of claim 9, wherein the maximum number of unique events in the buffer for cycle detection is less than the predetermined size of the buffer which indicates a maximum number of events in the buffer, and the maximum number of unique events in the buffer for cycle detection is less than a total number of events included in a total set of possible events during the execution of the application.

16. A non-transitory computer readable medium storing thereon computer executable instructions for detecting cyclic activity in an event stream during dynamic analysis of an application, including instructions for:

creating a buffer of a predetermined size for the event stream that occurs during an execution of the application, and determining a threshold representing a maximum number of unique events in the buffer for cycle detection;

processing each event in the event stream by filling the buffer with the event and determining a number of unique events in the buffer when the event is added to the buffer;

when a number of events in the buffer reaches the predetermined size of the buffer, replacing one event in the buffer with a new event by excluding an earliest event and including the new event that is newly processed, recalculating the number of unique events in the buffer, and comparing the recalculated number of unique events with the threshold; and detecting a beginning of a cycle in the buffer when the number of unique events in the buffer is less than or equal to the threshold, and, in response to the detection of the beginning of the cycle, excluding further events occurring in the event stream from subsequent analysis by skipping recording of data related to the further events, and continuing to add each of the further events to the buffer and recalculate the number of unique events in the buffer after said further event is added to the buffer, wherein the threshold is determined using a ratio: Xc=L/K, where Xc represents the maximum number of unique events in the buffer for cycle detection, L represents a parameter for the predetermined size of the buffer which indicates a maximum number of events in the buffer, K represents a configurable parameter.

17. The non-transitory computer readable medium of claim 16, further including instructions for:

when the number of unique events in the buffer is greater than the maximum number of unique events in the buffer for cycle detection, continuing to fill the buffer by replacing one event in the buffer with another new event that is newly processed and recalculating the number of unique events in the buffer until the number of unique events in the buffer is less than or equal to the maximum number of unique events in the buffer for cycle detection.

* * * * *